US007535513B2

(12) United States Patent
Lee (10) Patent No.: US 7,535,513 B2
(45) Date of Patent: May 19, 2009

(54) DEINTERLACING METHOD AND DEVICE IN USE OF FIELD VARIABLE PARTITION TYPE

(75) Inventor: Chang-min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 741 days.

(21) Appl. No.: 11/280,408

(22) Filed: Nov. 17, 2005

(65) Prior Publication Data

US 2006/0125956 A1 Jun. 15, 2006

(30) Foreign Application Priority Data

Nov. 17, 2004 (KR) ...................... 10-2004-0093907

(51) Int. Cl.
*H04N 7/01* (2006.01)
*H04B 1/66* (2006.01)
(52) U.S. Cl. .................................. 348/452; 375/240.16
(58) Field of Classification Search ................. 348/452, 348/459, 699, 701, 448
See application file for complete search history.

(56) References Cited

U.S. PATENT DOCUMENTS

| 6,473,460 B1 * | 10/2002 | Topper .................. 375/240.16 |
| 6,618,439 B1 | 9/2003 | Kuo et al. |
| 6,650,705 B1 * | 11/2003 | Vetro et al. ............ 375/240.08 |
| 6,900,846 B2 * | 5/2005 | Lee et al. .................... 348/459 |
| 7,362,374 B2 * | 4/2008 | Holt et al. ................... 348/446 |

FOREIGN PATENT DOCUMENTS

EP 1 164 792 12/2001

(Continued)

OTHER PUBLICATIONS

Chan, M. H. et al. "Variable Size Block Matching Motion Compensation with Applications to Video Coding" *IEE Proceedings I.*, vol. 137, No. 4, Aug. 1, 1990, pp. 205-212, XP00147601, Solid-State & Electron Devices, Institution of Electrical Engineers, Stevenage, GB.

(Continued)

*Primary Examiner*—Paulos M Natnael
(74) *Attorney, Agent, or Firm*—Roylance, Abrams, Berdo & Goodman, L.L.P.

(57) ABSTRACT

Disclosed is a deinterlacing method and device in use of a field variable partition type. The deinterlacing method includes partitioning one of a plurality of macro blocks composing a current field according to a first and a second main partition type, respectively. A first and a second main motion vector group are estimated, the first main motion vector group being a set of motion vectors for each of the main blocks generated by the first main partition type, and the second main motion vector group being a set of motion vectors for each of the main blocks generated by the second main partition type. One of the first main partition type and the second main partition type are determined as an optimum main partition type, and a main motion vector group corresponding to the optimum main partition type is determined as an optimum main motion vector group. Motion compensation is executed on the current field using the optimum main partition type and the optimum main motion vector group being determined. The current field and the motion compensated current field are merged thereby generating a progressive image.

14 Claims, 5 Drawing Sheets

FOREIGN PATENT DOCUMENTS

| | | |
|---|---|---|
| KR | 2003-0037345 | 5/2003 |
| KR | 2004-0048478 | 6/2004 |

OTHER PUBLICATIONS

Dufaux, F. et al. "Motion Estimation Techniques For Digital TV: A Review an A New Contribution," *Proceedings of the IEEE*, vol. 83, No. 6, Jun. 1995, pp. 858-875, ,XP000518740, ISSN: 0018-9219, IEEE, New York, US.

Wang, L. et al. "Interlace Coding Tools for H.26L Video Coding," ITU Study Group 16- Video Coding Experts Group VCEG-037.Doc [Online], Dec. 4, 2001, pp. 1-20, XP02240263.

* cited by examiner

FIG. 4 macro block

Type A

Type B

Type C

Type D main blocks ( 16×16, 8×16, 16×8, 8×8)

Type D

Type E

Type F

Type G sub blocks ( 8×8, 4×8, 8×4, 4×4)

FIG. 5

| Type | Motion_vector | | | | | | | | sum |
|---|---|---|---|---|---|---|---|---|---|
| A | MV_A | | | | | | | | MAD_A |
| B | MV_B1 | MV_B2 | | | | | | | MAD_B |
| C | MV_C1 | MV_C2 | | | | | | | MAD_C |
| D | MV_D1 | MV_D2 | MV_D3 | MV_D4 | | | | | MAD_D |
| | | | | | | | | | |
| | | | | | | | | | |
| | | | | | | | | | |
| | | | | | | | | | |

FIG. 6

DEINTERLACING METHOD AND DEVICE IN USE OF FIELD VARIABLE PARTITION TYPE

CROSS-REFERENCE TO RELATED APPLICATIONS

This application claims benefit under 35 U.S.C. § 119(a) of Korean Patent Application No. 2004-93907, filed on Nov. 17, 2004 the entire disclosure of which is hereby incorporated by reference.

BACKGROUND OF THE INVENTION

1. Field of the Invention

The present invention relates generally to a deinterlacing method and device. More specifically, the present invention relates to a deinterlacing method and device for converting an interlaced image to a progressive image.

2. Description of the Related Art

Deinterlacing is a technique that converts an interlaced image to a progressive image. The most common deinterlacing technique is reproducing a TV broadcast or video recorded on a DVD for display on a computer monitor.

Figure 1:
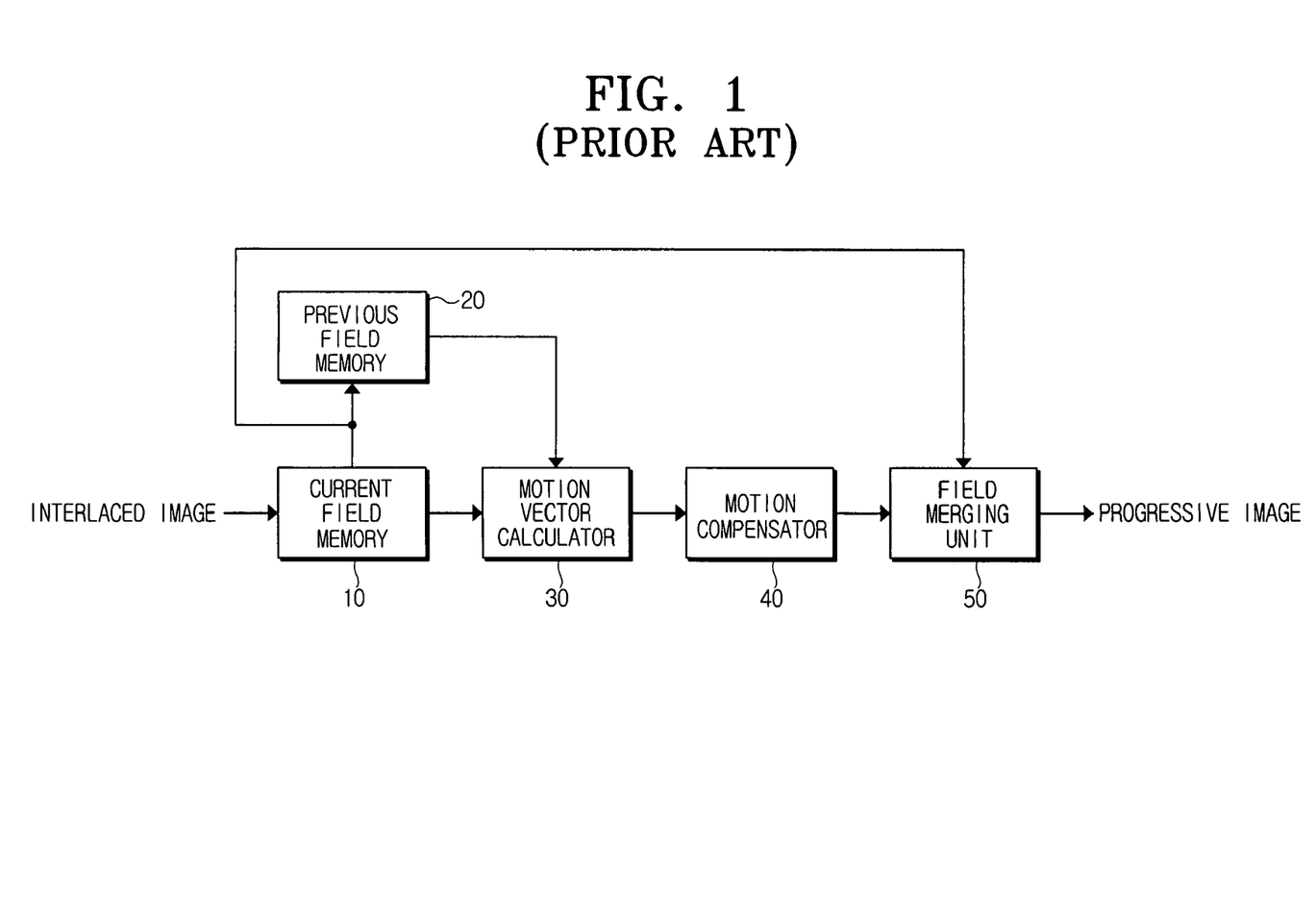
FIG. 1 is a schematic block diagram of a conventional deinterlacing device.

FIG. 1 is a schematic block diagram of a conventional deinterlacing device. The following will now explain a deinterlacing procedure executed by the deinterlacing device shown in FIG. 1.

At first, a motion vector calculator 30 calculates a motion vector using a current field and a previous field stored in a current field memory 10 and a previous field memory 20, respectively. A motion compensator 40 executes motion compensation on the current field using the motion vector calculated by the motion vector calculator 30. Then, a field merging unit 50 merges a 'current field' stored in the current field memory 10 with a 'motion-compensated current field' generated by the motion compensator 40, to generate a progressive image.

As explained above, deinterlacing involves motion compensation using a calculated motion vector. Therefore, it is very important to calculate the motion vector as accurately as possible for proper deinterlacing. When deinterlacing is done properly, high quality progressive images (that is, vivid images) are provided to a user.

For the calculation of a motion vector, a current field is partitioned into a plurality of blocks, and a motion vector is calculated for each of the blocks. For instance, a related deinterlacing device usually partitions a current field into a plurality of blocks, each block being 8×8 in size.

To calculate a motion vector more accurately, however, it is more efficient to partition a high frequency area into small blocks, and a low frequency area into large blocks. Nevertheless, conventional deinterlacing methods execute deinterlacing by dividing a current field into fixed size blocks (such as 8×8). As a result, deinterlacing is often executed in a non-optimal manner.

SUMMARY OF THE INVENTION

It is, therefore, an object of the present invention to provide a deinterlacing device and method in use of a field variable partition type, through which a motion vector can be calculated more accurately and thus, deinterlacing is executed more accurately.

To achieve the above objects and advantages, there is provided a deinterlacing method that includes partitioning one of a plurality of macro blocks composing a current field according to a first main partition type and a second main partition type. A first main motion vector group and a second main motion vector group are estimated, the first main motion vector group being a set of motion vectors for each of the plurality of main blocks generated by the first main partition type, and the second main motion vector group being a set of motion vectors for each of the plurality of main blocks generated by the second main partition type. One of the first main partition type and the second main partition type are determined as an optimum main partition type, and a main motion vector group corresponding to the optimum main partition type is determined as an optimum main motion vector group. Motion compensation is executed on the current field using the optimum main partition type and the optimum main motion vector group being determined. The current field and the motion compensated current field are merged thereby generating a progressive image.

Preferably, in the determination step, the main partition type corresponding to a smaller sum of main motion differences among a first sum of main motion differences and a second sum of main motion differences is determined as the optimum main partition type, the first sum of main motion differences being the sum of motion differences used as a basis for estimating motion vectors for each of the plurality of main blocks generated by the first main partition type, and the second sum of main motion differences being the sum of motion differences used as a basis for estimating motion vectors for each of the plurality of main blocks generated by the second main partition type.

Preferably, the macro block is a 16×16 block; the plurality of main blocks generated by the first main partition type are one of (one 16×16 block), (two 8×16 blocks), (two 16×8 blocks) and (four 8×8 blocks); and the plurality of main blocks generated by the second main partition type are one of (one 16×16 block), (two 8×16 blocks), (two 16×8 blocks) and (four 8×8 blocks).

Preferably, if the second main partition type partitions the macro block into dense main blocks more than the first main partition type and is determined as the optimum main partition type, the method further includes repartitioning one of the plurality of main blocks generated by the first main partition type into sub blocks according to a first sub partition type and a second sub partition type, respectively. A first sub motion vector group and a second sub motion vector group are estimated, the first sub motion vector group being a set of sub motion vectors for each of the plurality of sub blocks generated by the first sub partition type, and the second sub motion vector group being a set of sub motion vectors for each of the plurality of sub blocks generated by the second sub partition type. One of the first sub partition type and the second sub partition type are determined as an optimum sub partition type, and a sub motion vector group corresponding to the optimum sub partition type is determined as an optimum sub motion vector group. Motion compensation is executed on the current field using the optimum sub partition type and the optimum sub motion vector group that have been determined.

Preferably, in the determination step, the sub partition type corresponding to a smaller sum of sub motion differences among a first sum of sub motion differences and a second sum of sub motion differences is determined as the optimum sub partition type, the first sum of sub motion differences being the sum of motion differences used as a basis for estimating motion vectors for each of the plurality of sub blocks generated by the first sub partition type, and the second sum of sub motion differences being the sum of motion differences used as a basis for estimating motion vectors for each of the plurality of sub blocks generated by the second sub partition type.

Preferably, the plurality of main blocks generated by the second main partition type are four 8×8 blocks; the plurality of sub blocks generated by the first sub partition type are one of (one 8×8 block), (two 4×8 blocks), (two 8×4 blocks) and (four 4×4 blocks); and the plurality of sub blocks generated by the second sub partition type are one of (one 8×8 block), (two 4×8 blocks), (two 8×4 blocks) and (four 4×4 blocks).

Also, the progressive image is preferably generated by merging the compensated field into the lower portion of the current field if a slope of the optimum main motion vector group is a downward slope (−) and by merging the compensated field into the above portion of the current field if a slope of the determined motion vector groups is an upward slope (+).

Another aspect of the present invention provides a deinterlacing device, including a partitioner for partitioning one of a plurality of macro blocks composing a current field according to a first main partition type and a second main partition type, respectively. A motion estimator estimates a first main motion vector group and a second main motion vector group, the first main motion vector group being a set of motion vectors for each of the plurality of main blocks generated by the first main partition type, and the second main motion vector group being a set of motion vectors for each of the plurality of main blocks generated by the second main partition type. A determination unit determines one of the first main partition type and the second main partition type as an optimum main partition type, and determines a main motion vector group corresponding to the optimum main partition type as an optimum main motion vector group. A motion compensator executes motion compensation on the current field using the optimum main partition type and the optimum main motion vector group being determined. An adaptive field merging unit merges the current field and the motion compensated current field and thereby generates a progressive image.

Preferably, the determination unit determines the main partition type corresponding to a smaller sum of main motion differences among a first sum of main motion differences and a second sum of main motion differences as the optimum main partition type, the first sum of main motion differences being the sum of motion differences used as a basis for estimating motion vectors for each of the plurality of main blocks generated by the first main partition type, and the second sum of main motion differences being the sum of motion differences used as a basis for estimating motion vectors for each of the plurality of main blocks generated by the second main partition type.

Preferably, the macro block is a 16×16 block; the plurality of main blocks generated by the first main partition type are one of (one 16×16 block), (two 8×16 blocks), (two 16×8 blocks) and (four 8×8 blocks); and the plurality of main blocks generated by the second main partition type are one of (one 16×16 block), (two 8×16 blocks), (two 16×8 blocks) and (four 8×8 blocks).

Preferably, if the second main partition type partitions the macro block into dense main blocks more than the first main partition type and is determined as the optimum main partition type, the partitioner repartitions one of the plurality of main blocks generated by the first main partition type into sub blocks according to a first sub partition type and a second sub partition type, respectively. The motion estimator estimates a first sub motion vector group and a second sub motion vector group, the first sub motion vector group being a set of sub motion vectors for each of the plurality of sub blocks generated by the first sub partition type, and the second sub motion vector group being a set of sub motion vectors for each of the plurality of sub blocks generated by the second sub partition type. The determination unit determines one of the first sub partition type and the second sub partition type as an optimum sub partition type, and determines a sub motion vector group corresponding to the optimum sub partition type as an optimum sub motion vector group. The motion compensator executes motion compensation on the current field using the optimum sub partition type and the optimum sub motion vector group being determined.

Preferably, the determination unit determines the sub partition type corresponding to a smaller sum of sub motion differences among a first sum of sub motion differences and a second sum of sub motion differences as the optimum sub partition type, the first sum of sub motion differences being the sum of motion differences used as a basis for estimating motion vectors for each of the plurality of sub blocks generated by the first sub partition type, and the second sum of sub motion differences being the sum of motion differences used as a basis for estimating motion vectors for each of the plurality of sub blocks generated by the second sub partition type.

Preferably, the plurality of main blocks generated by the second main partition type are four 8×8 blocks; the plurality of sub blocks generated by the first sub partition type are one of (one 8×8 block), (two 4×8 blocks), (two 8×4 blocks) and (four 4×4 blocks); and the plurality of sub blocks generated by the second sub partition type are one of (one 8×8 block), (two 4×8 blocks), (two 8×4 blocks) and (four 4×4 blocks).

Also, the adaptive field merging unit preferably generates a progressive image by merging the compensated field into the lower portion of the current field if a slope of the optimum main motion vector group is a downward slope (−), and by merging the compensated field into the above portion of the current field if a slope of the determined motion vector groups is an upward slope (+).

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF EXEMPLARY EMBODIMENTS

An exemplary embodiment of the present invention will be described herein with reference to the accompanying drawings.

Figure 2:
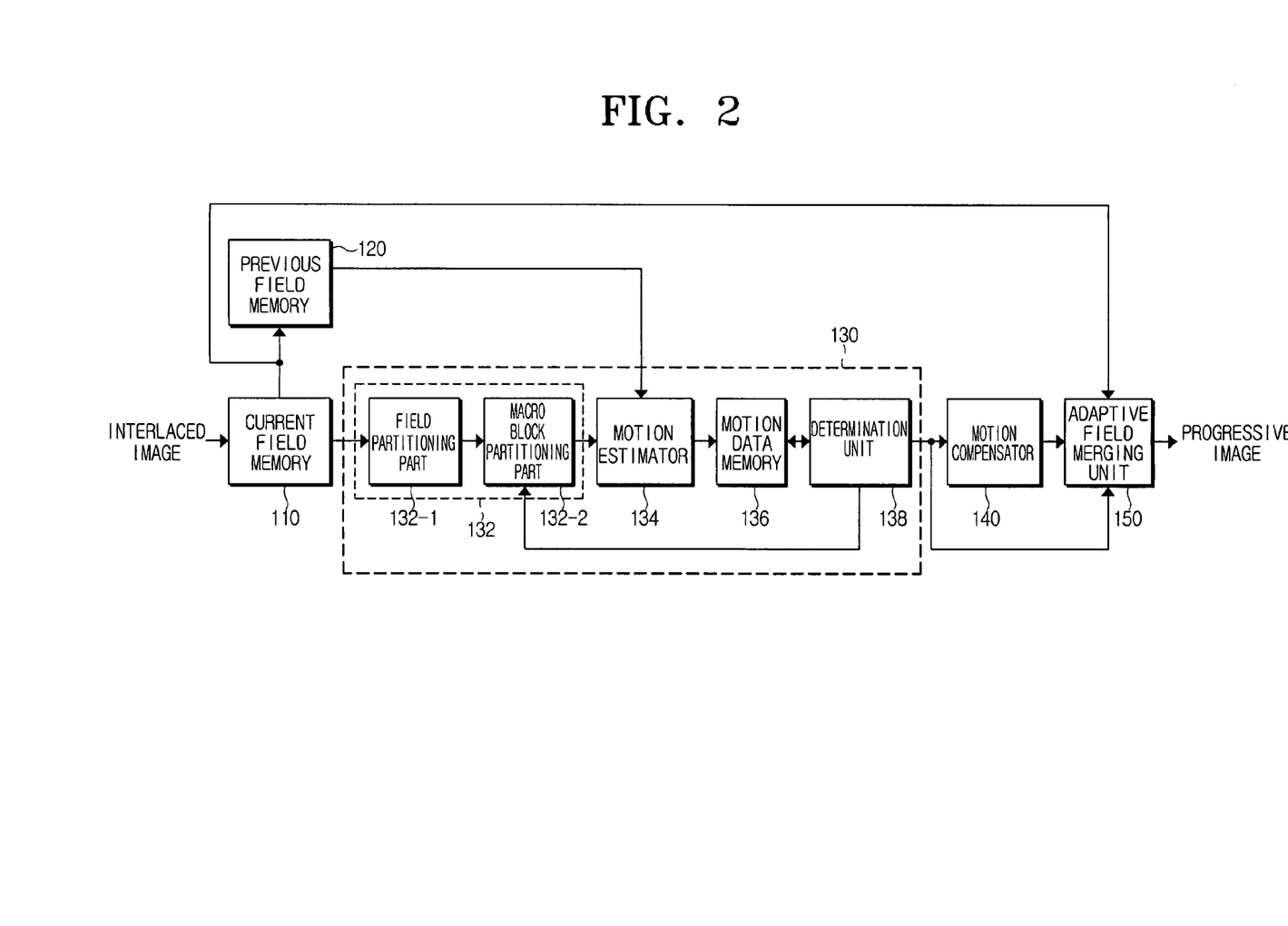
FIG. 2 is a schematic block diagram of a deinterlacing device according to an embodiment of the present invention, in which the deinterlacing device executes deinterlacing in use of a field variable partition type.

FIG. 2 is a block diagram of a deinterlacing device according to an embodiment of the present invention. The deinterlacing device deinterlaces an input interlaced image to generate a progressive image. In particular, the deinterlacing device according to an exemplary embodiment of the present invention uses a field variable partition type.

Referring to FIG. 2, the deinterlacing device includes a current field memory 110, a previous field memory 120, a motion vector calculator 130, a motion compensator 140, and an adaptive field merging unit 150.

In the exemplary deinterlacing device, an interlaced image is received. The current field memory 110 stores a 'currently received field' (hereinafter, 'current field'), and the previous field memory 120 stores a previous field that is delayed from the current field by one field period. As a result, a current field is stored in the current field memory 110, whereas a previous field is stored in the previous field memory 120.

The motion vector calculator 130 calculates a motion vector using a current field and a previous field stored in the current field memory 110 and the previous field memory 120, respectively. For optimum deinterlacing, the motion vector calculator 130 partitions the current field into a plurality of blocks according to an optimum partition type, and calculates a set of motion vectors for partitioned blocks (hereinafter, 'motion vector group').

The motion vector calculator 130 includes a partitioner 132, a motion estimator 134, a motion data memory 136, and a determination unit 138.

The partitioner 132 partitions a current field into a plurality of blocks. The partitioner 132 includes a field partitioning part 132-1 and a macro block partitioning part 132-2.

The field partitioning part 132-1 partitions a current field read from the current field memory 110 into a plurality of macro blocks. The macro block partitioning part 132-2 partitions each of the macro blocks into a plurality of blocks. There are several ways for the macro block partitioning part 132-2 to partition a macro block into a plurality of blocks (hereinafter, referred to as 'partition types').

The motion estimator 134 estimates a motion vector for each of the blocks generated by the macro block partitioning part 132-2. To this end, the motion estimator 134 searches on a previous field a point where motion difference with a block is minimum, and estimates a vector heading from the searched point on the previous field for a position on the current field as a motion vector. With the motion difference, it becomes possible to hypothesize a Mean Absolute Difference (MAD).

A set of motion vectors for blocks (hereinafter, referred to as 'motion vector group') estimated by the motion estimator 134 is stored in the motion data memory 136. Also, the motion data memory 136 stores a sum of motion differences that is used as a basis for estimating motion vectors for blocks (hereinafter, referred to as 'sum of motion differences).

The determination unit 138 determines an optimum partition type, on the basis of the sums of the motion differences stored in the motion data memory 136. In more detail, the determination unit 138 designates a partition type corresponding to a minimum value among the sums of the motion differences as the optimum partition type. And, the determination unit 138 determines a motion vector group corresponding to the optimum partition type as an optimum motion vector group.

The determination unit 138 reads the optimum partition type and its corresponding motion vector group from the motion data memory 136, and applies them to the motion compensator 140.

Then, the motion compensator 140 executes motion compensation for a current field, by using the optimum partition types and the optimum motion vector groups applied from the determination unit 138.

The adaptive field merging unit 150 merges a current field stored in the current field memory 110 with a motion-compensated current field (hereinafter, referred to as 'compensated field) generated in the motion compensator 140. As a result, a progressive image is output from the adaptive field merging unit 150.

To perform the merging process, the adaptive field merging unit 150 refers to the motion vector groups determined by the determination unit 138. More specifically, if the slope of the determined motion vector groups is a downward slope (−), the adaptive field merging unit 150 merges the compensated field into the lower portion of the current field. On the other hand, if the slope of the determined motion vector groups is an upward slope (+), the adaptive field merging unit 150 merges the compensated field into the above portion of the current field.

Figure 3:
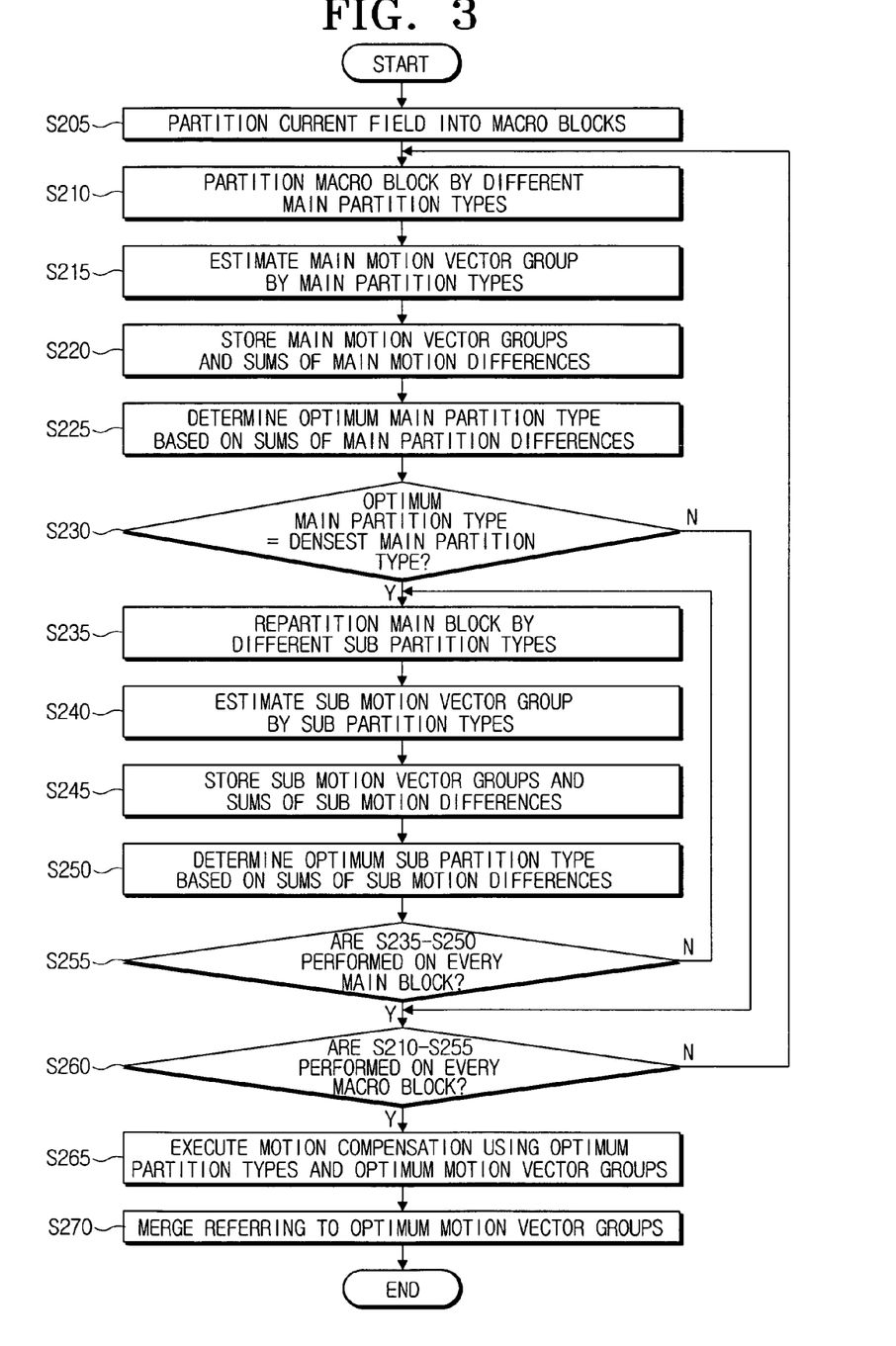
FIG. 3 is a flow chart explaining a deinterlacing method in use of a field variable partition type, according to an embodiment of the present invention.

The following will describe how the exemplary deinterlacing device of FIG. 2 executes deinterlacing. FIG. 3 is a flow chart explaining a deinterlacing method in use of a current field variable partition type, according to an exemplary embodiment of the present invention.

Referring to FIG. 3, first, the field partitioning part 132-1 partitions a current field read from the current field memory 110 into a plurality of macro blocks (S205). At this time, the size of a macro block is 16×16.

Then, the macro block partitioning part 132-2 partitions each of the macro blocks into a plurality of main blocks, respectively, using different 'main partition types' (S210). Here, the main partition type means a partition type that partitions a macro block into a plurality of main blocks.

There are several main partition types. For instance, if the macro block is a 16×16 block, the main partition types preferably partition a macro block into (i) one 16×16 main block (Type A), (ii) two 8×16 main blocks (Type B), (iii) two 16×8 main blocks (Type C), and (iv) four 8×8 main blocks (Type D). Technically speaking, 'Type A' is not a partition in that the macro block and the main block are the same, but it can be regarded as one of the partition types for convenience sake.

Figure 4:
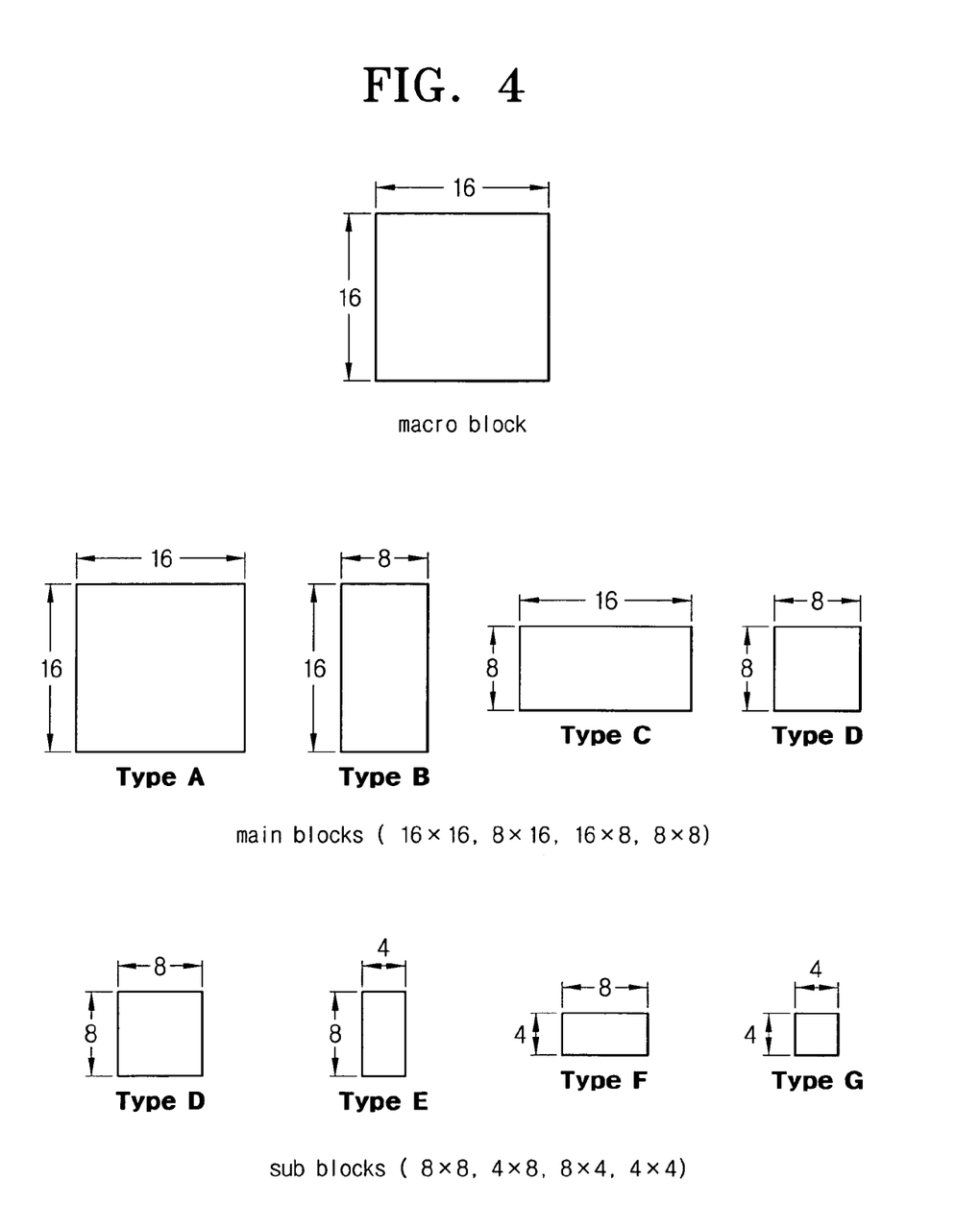
FIG. 4 illustrates a macro block, main blocks and sub blocks according to an embodiment of the present invention.

FIG. 4 illustrates a macro block and main blocks as described above.

Afterwards, the motion estimator 134 estimates a main motion vector group per main partition type applied in step S210 (S215). Here, the main motion vector group indicates a set of motion vectors for main blocks generated in step S210.

For example, suppose that Type A, Type B, Type C and Type D are utilized as main partition types in step S210. Then, the motion estimator 134 estimates a main motion vector group when (i) the macro block is partitioned according to 'Type A' (hereinafter, 'A main motion vector group'), (ii) the macro block is partitioned according to 'Type B' (hereinafter, 'B main motion vector group'), (iii) the macro block is partitioned according to 'Type C' (hereinafter, 'C main motion vector group'), and (iv) the macro block is partitioned according to 'Type D' (hereinafter, 'D main motion vector group'), respectively.

Also, the motion estimator 134 stores the estimated main motion vector group in step S215 and the sum of main motion differences in the motion memory 136 by main partition types that are applied in step S210 (S220). Here, the sum of main motion differences means the sum of motion differences being used as a basis for estimating motion vectors for the main blocks generated in step S210.

Figure 5:
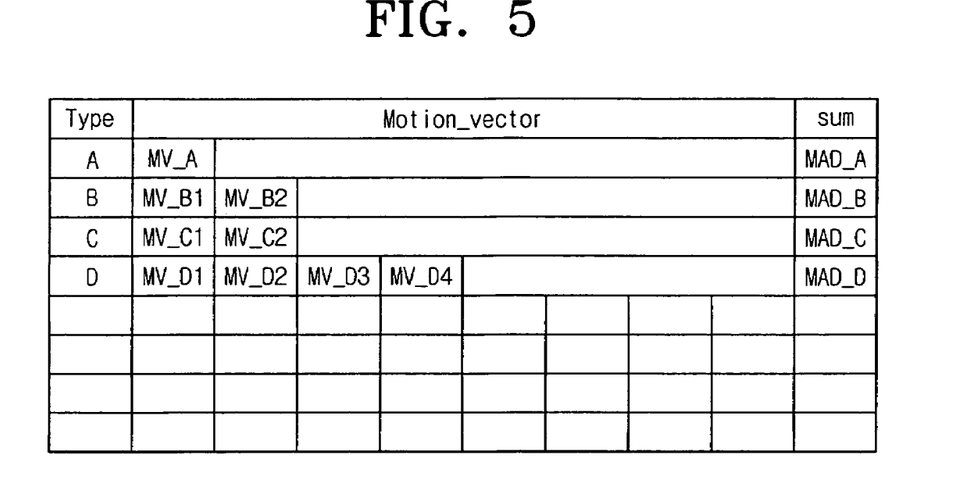
FIG. 5 is a diagram illustrating a status of a motion memory according to an embodiment of the present invention.

For better understanding of step S220, FIG. 5 illustrates the storage status of the motion memory 136 to which the main partition types 'Type A', 'Type B', 'Type C' and 'Type D' in step S210 are applied.

As shown in FIG. 5, in the motion memory 136, a main motion vector group Motion_vector and a sum of main motion differences are stored for each main partition type.

In detail, when the macro block is partitioned according to the 'Type A', the 16×16 macro block is partitioned into one 16×16 main block. Therefore, the motion estimator 134 estimates and stores a motion vector MV_A for the 16×16 main block in the motion memory 136. Moreover, the motion estimator 134 stores the sum of the motion difference MAD_A used as a basis for estimating the motion vector MV_A in the motion memory 136 as the sum of the main differences A. In short, the main motion vector group A is composed of one motion vector MV_A.

On the other hand, when the macro block is partitioned according to the 'Type B', the 16×16 macro block is partitioned into two 8×16 main blocks. Therefore, the motion estimator 134 estimates and stores motion vectors MV_B1, MV_B2 for those two 8×16 main blocks in the motion memory 136. Moreover, the motion estimator 134 stores the sum of motion differences MAD_B1, MAD_B2 used as a basis for estimating the motion vectors MV_B1, MV_B2 in the motion memory 136 as the sum of the main differences B (MAD_B=MAD_B1+MAD_B2). In short, the main motion vector group B is composed of two motion vectors MV_B1, MV_B2.

When the macro block is partitioned according to the 'Type C' or 'Type D', the storage status of the motion memory 136 can be analogized from the case according to 'Type B'. Therefore, a detailed description thereof will be omitted.

Referring again to FIG. 3, the determination unit 138 determines an optimum main partition type, on the basis of the sums of the main motion differences stored in the motion data memory 136 (S225). More specifically, the determination unit 138 determines a main partition type corresponding to a minimum value among the sums of the main motion differences in the memory 136 as the optimum main partition type.

To elaborate the above in reference to FIG. 5, among the sums of the main motion differences MAD_A, MAD_B, MAD_C, MAD_D stored in the motion memory 136, if the sum of main motion difference C MAD_C has a minimum value, the determination part 138 determines the 'Type C' as the optimum main partition type in step S225.

If the optimum main partition type determined in step S225 happens to be the densest main partition type (S230), the deinterlacing device repartitions each of the main blocks (these have already been partitioned by their own main partition types) according to different sub partition types, respectively, and determines an optimum sub partition type using the repartitioned sub blocks (S235-S255). Particularly, this corresponds to a case where the optimum main partition type determined in step S225 is the 'Type D'.

Meanwhile, if the optimum main partition type determined in step S225 is not the densest main partition type (that is, one of the 'Type A', 'Type B', or 'Type C' is determined as the optimum main partition type), the procedure from steps S235-S255 are not executed.

In effect, a person skilled in the art can analogize the procedure from steps S235-S255 by steps S210-S255, so the procedure will be explained briefly below.

First, the macro block partitioning part 132-2 repartitions the main blocks having been partitioned by the optimum main partition type determined in step S225 into a plurality of sub blocks according to different sub partition types (S235). Here, the sub partition type means a partition type for partitioning a main block into a plurality of sub blocks.

There are several sub partition types. For instance, if the macro block is an 8×8 block, the sub partition types preferably partition a main block into (i) one 8×8 sub block (Type D), (ii) two 4×8 sub blocks (Type E), (iii) two 8×4 sub blocks (Type F), or (iv) four 4×4 sub blocks (Type G). Technically speaking, 'Type D' is not a partition in that the main block and the sub block are the same, but it is regarded as one of the partition types for convenience sake.

FIG. 4 illustrates sub blocks described above.

Later, the motion estimator 134 estimates a sub motion vector group per sub partition type applied in step S235 (S240). Here, the sub motion vector group indicates 'a set of motion vectors for sub blocks' generated in step S235.

Also, the motion estimator 134 stores the estimated sub motion vector group in step S240 and the sum of sub motion differences in the motion memory 136 by sub partition types that are applied in step S235 (S245). Here, the sum of sub motion differences means the sum of motion differences being used as a basis for estimating motion vectors for the sub blocks generated in step S235.

Next, the determination unit 138 determines an optimum sub partition type, on the basis of sums of the sub motion differences stored in the motion data memory 136 (S250). In detail, the determination unit 138 designates a sub partition type corresponding to a minimum value among the sums of the sub motion differences as the optimum sub partition type.

The procedure in steps S235-S250 continues until it is applied to every main block having been partitioned by the optimum main partition type (S255).

Also, the procedure in steps S210-S255 continues until it is applied to every macro block having been partitioned in step S205 (S260).

Therefore, by the procedure explained in steps S205-S260, motion vector data is calculated for one current field.

Figure 6:
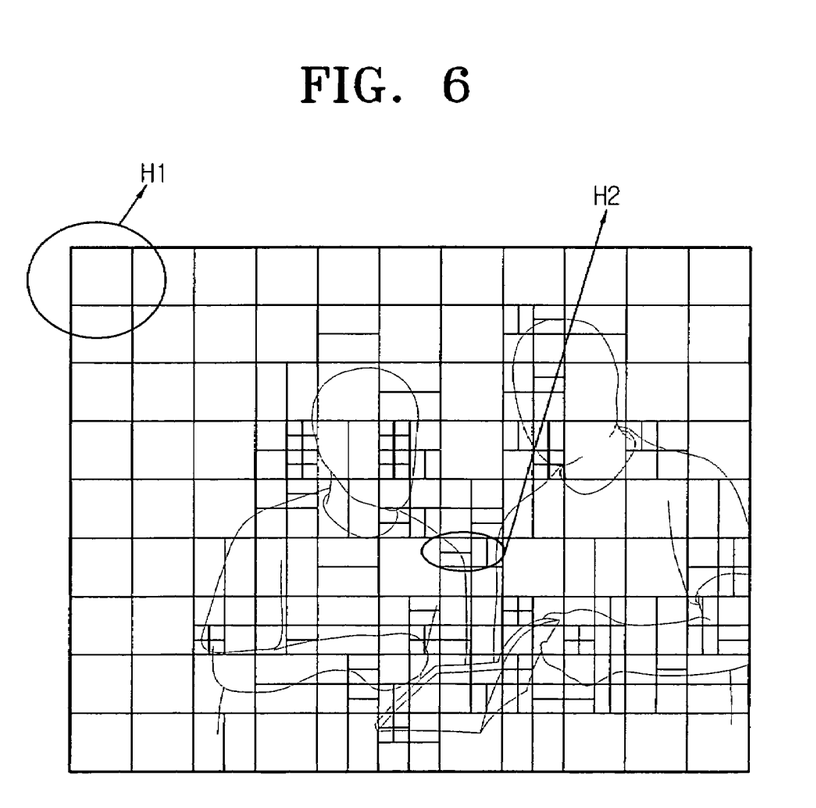
FIG. 6 is a picture for explaining how to determine an optimum partition type by area types according to an embodiment of the present invention.

FIG. 6 is a picture for explaining how to determine the optimum partition type by area types. In FIG. 6, the 'H1' area is a low frequency area. Thus, the 'H1' area is preferably partitioned into large blocks in order to get a more accurate motion vector. On the other hand, the 'H2' area is a high frequency area. Thus, the 'H2' area is preferably partitioned into small blocks to in order to get a more accurate motion vector.

In conventional deinterlacing methods, both 'H1' and 'H2' areas are partitioned into blocks of the same size. In contrast, according to the deinterlacing method of an embodiment of the present invention, the 'H1' area is partitioned into a large blocks (such as, Type A), and the 'H2' area is partitioned into small blocks (such as, Type G). As such, the deinterlacing method of embodiments of the present invention makes it possible to calculate a motion vector more accurately.

Turning back to FIG. 3, using the optimum (main/sub) partition types and their corresponding optimum (main/sub) motion vector groups determined in steps S225 and S250 by the determination unit 138, motion compensation is executed on a current field (S265).

Also, the adaptive field merging unit 150 merges the current field with a compensated field, referring to the optimum (main/sub) motion vector groups determined in steps S225 and S250 (S270). In detail, if the slope of the optimum vector groups is a downward slope (−), the adaptive field merging unit 150 merges the compensated field into the lower portion the current field. On the other hand, if the slope of the optimum motion vector groups is an upward slope (+), the adaptive field merging unit 150 merges the compensated field into the above portion of the current field. As a result, a progressive image is output from the adaptive field merging unit 150.

Afterwards, the procedure in steps S205-S270 is performed again on a field that is received subsequent to the current field (that is, the next field).

So far, the deinterlacing method and device in use of the field variable partition type have been explained in detail. The deinterlacing method and device of embodiments of the present invention can be applied to an image display apparatus.

In conclusion, embodiments of the present invention make it possible to calculate a more accurate motion vector by using the (optimum) field variable partition type, and proper deinterlacing can be executed based on the accurate motion vector. Moreover, because a proper merging type is determined on the basis of the motion vector, the most suitable deinterlacing can be performed. Accordingly, the user is provided with progressive images of the best quality.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A deinterlacing method, comprising the steps of:
   partitioning one of a plurality of macro blocks composing a current field according to a first main partition type and a second main partition type, respectively;
   estimating a first main motion vector group and a second main motion vector group, the first main motion vector group being a set of motion vectors for each of the plurality of main blocks generated by the first main partition type, and the second main motion vector group being a set of motion vectors for each of the plurality of main blocks generated by the second main partition type;
   determining one of the first main partition type and the second main partition type as an optimum main partition type, and determining a main motion vector group corresponding to the optimum main partition type as an optimum main motion vector group;
   executing motion compensation on the current field using the optimum main partition type and the optimum main motion vector group being determined; and
   merging the current field and the motion compensated current field and thereby generating a progressive image.

2. The method according to claim 1, wherein, in the determination step, the main partition type corresponding to a smaller sum of main motion differences among a first sum of main motion differences and a second sum of main motion differences is determined as the optimum main partition type, the first sum of main motion differences being the sum of motion differences used as a basis for estimating motion vectors for each of the plurality of main blocks generated by the first main partition type, and the second sum of main motion differences being the sum of motion differences used as a basis for estimating motion vectors for each of the plurality of main blocks generated by the second main partition type.

3. The method according to claim 1, wherein the macro block is a 16×16 block;
   the plurality of main blocks generated by the first main partition type are one of (one 16×16 block), (two 8×16 blocks), (two 16×8 blocks) and (four 8×8 blocks); and
   the plurality of main blocks generated by the second main partition type are one of (one 16×16 block), (two 8×16 blocks), (two 16×8 blocks) and (four 8×8 blocks).

4. The method according to claim 1, wherein, if the second main partition type partitions the macro block into dense main blocks more than the first main partition type and is determined as the optimum main partition type, the method further comprises the steps of:
   repartitioning one of the plurality of main blocks generated by the second main partition type into sub blocks according to a first sub partition type and a second sub partition type, respectively;
   estimating a first sub motion vector group and a second sub motion vector group, the first sub motion vector group being a set of sub motion vectors for each of the plurality of sub blocks generated by the first sub partition type, and the second sub motion vector group being a set of sub motion vectors for each of the plurality of sub blocks generated by the second sub partition type;
   determining one of the first sub partition type and the second sub partition type as an optimum sub partition type, and determining a sub motion vector group corresponding to the optimum sub partition type as an optimum sub motion vector group; and
   executing motion compensation on the current field using the optimum sub partition type and the optimum sub motion vector group being determined.

5. The method according to claim 4, wherein, in the determination step, the sub partition type corresponding to a smaller sum of sub motion differences among a first sum of sub motion differences and a second sum of sub motion differences is determined as the optimum sub partition type, the first sum of sub motion differences being the sum of motion differences used as a basis for estimating motion vectors for each of the plurality of sub blocks generated by the first sub partition type, and the second sum of sub motion differences being the sum of motion differences used as a basis for estimating motion vectors for each of the plurality of sub blocks generated by the second sub partition type.

6. The method according to claim 4, wherein the plurality of main blocks generated by the second main partition type are four 8×8 blocks;
   the plurality of sub blocks generated by the first sub partition type are one of (one 8×8 block), (two 4×8 blocks), (two 8×4 blocks) and (four 4×4 blocks); and
   the plurality of sub blocks generated by the second sub partition type are one of (one 8×8 block), (two 4×8 blocks), (two 8×4 blocks) and (four 4×4 blocks).

7. The method according to claim 1, wherein, in the merging step, the progressive image is generated by merging the compensated field into the lower portion of the current field if a slope of the optimum main motion vector group is a downward slope (−), and by merging the compensated field into the above portion of the current field if the slope of the optimum main motion vector groups is an upward slope (+).

8. A deinterlacing device, comprising:
   a partitioner for partitioning one of a plurality of macro blocks composing a current field according to a first main partition type and a second main partition type, respectively;
   a motion estimator for estimating a first main motion vector group and a second main motion vector group, the first main motion vector group being a set of motion vectors for each of the plurality of main blocks generated by the first main partition type, and the second main motion vector group being a set of motion vectors for each of the plurality of main blocks generated by the second main partition type;

a determination unit for determining one of the first main partition type and the second main partition type as an optimum main partition type, and determining a main motion vector group corresponding to the optimum main partition type as an optimum main motion vector group;

a motion compensator for executing motion compensation on the current field using the optimum main partition type and the optimum main motion vector group being determined; and an adaptive filed merging unit for merging the current field and the motion compensated current field and thereby generating a progressive image.

9. The device according to claim 8, wherein the determination unit determines the main partition type corresponding to a smaller sum of main motion differences among a first sum of main motion differences and a second sum of main motion differences as the optimum main partition type, the first sum of main motion differences being the sum of motion differences used as a basis for estimating motion vectors for each of the plurality of main blocks generated by the first main partition type, and the second sum of main motion differences being the sum of motion differences used as a basis for estimating motion vectors for each of the plurality of main blocks generated by the second main partition type.

10. The device according to claim 8, wherein the macro block is a 16×16 block;

the plurality of main blocks generated by the first main partition type are one of (one 16×16 block), (two 8×16 blocks), (two 16×8 blocks) and (four 8×8 blocks); and the plurality of main blocks generated by the second main partition type are one of (one 16×16 block), (two 8×16 blocks), (two 16×8 blocks) and (four 8×8 blocks).

11. The device according to claim 8, wherein, if the second main partition type partitions the macro block into dense main blocks more than the first main partition type and is determined as the optimum main partition type, the partitioner repartitions one of the plurality of main blocks generated by the second main partition type into sub blocks according to a first sub partition type and a second sub partition type, respectively;

the motion estimator estimates a first sub motion vector group and a second sub motion vector group, the first sub motion vector group being a set of sub motion vectors for each of the plurality of sub blocks generated by the first sub partition type, and the second sub motion vector group being a set of sub motion vectors for each of the plurality of sub blocks generated by the second sub partition type;

the determination unit determines one of the first sub partition type and the second sub partition type as an optimum sub partition type, and determining a sub motion vector group corresponding to the optimum sub partition type as an optimum sub motion vector group; and the motion compensator executes motion compensation on the current field using the optimum sub partition type and the optimum sub motion vector group being determined.

12. The device according to claim 11, wherein, the determination unit determines the sub partition type corresponding to a smaller sum of sub motion differences among a first sum of sub motion differences and a second sum of sub motion differences as the optimum sub partition type, the first sum of sub motion differences being the sum of motion differences used as a basis for estimating motion vectors for each of the plurality of sub blocks generated by the first sub partition type, and the second sum of sub motion differences being the sum of motion differences used as a basis for estimating motion vectors for each of the plurality of sub blocks generated by the second sub partition type.

13. The device according to claim 11, wherein the plurality of main blocks generated by the second main partition type are four 8×8 blocks;

the plurality of sub blocks generated by the first sub partition type are one of (one 8×8 block), (two 4×8 blocks), (two 8×4 blocks) and (four 4×4 blocks); and the plurality of sub blocks generated by the second sub partition type are one of (one 8×8 block), (two 4×8 blocks), (two 8×4 blocks) and (four 4×4 blocks).

14. The device according to claim 8, wherein the adaptive field merging unit generates a progressive image by merging the compensated field into the lower portion of the current field if a slope of the optimum main motion vector group is a downward slope (−), and by merging the compensated field into the above portion of the current field if the slope of the optimum main motion vector groups is an upward slope (+).

* * * * *